(12) United States Patent
Muller et al.

(10) Patent No.: US 8,931,339 B2
(45) Date of Patent: Jan. 13, 2015

(54) METHOD FOR EVALUATING THE MEASUREMENT SIGNALS OF A PROPAGATION-TIME BASED MEASUREMENT DEVICE

(75) Inventors: Roland Muller, Steinen (DE); Herbert Schroth, Schopfheim (DE); Stefan Cramer, Wetzlar (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 2741 days.

(21) Appl. No.: 10/484,920

(22) PCT Filed: Jul. 26, 2002

(86) PCT No.: PCT/EP02/08368
§ 371 (c)(1),
(2), (4) Date: Dec. 16, 2008

(87) PCT Pub. No.: WO03/016835
PCT Pub. Date: Feb. 27, 2003

(65) Prior Publication Data
US 2011/0094299 A1    Apr. 28, 2011

(30) Foreign Application Priority Data

Jul. 27, 2001  (DE) .................................. 101 36 565

(51) Int. Cl.
*G01F 23/00*    (2006.01)
*G01F 23/284*   (2006.01)

(52) U.S. Cl.
CPC .......... *G01F 23/284* (2013.01); *G01F 23/0076* (2013.01)
USPC ...................................................... 73/290 R

(58) Field of Classification Search
USPC ................................ 73/290 R–290 V; 702/55
See application file for complete search history.

(56) References Cited

U.S. PATENT DOCUMENTS 3,474,337 A * 10/1969 Petrick .......................... 324/644
5,136,299 A *  8/1992 Edvardsson .................. 342/124
(Continued)

FOREIGN PATENT DOCUMENTS

EP       1 020 735 A2    7/2000
GB       2164151         3/1986
(Continued)

OTHER PUBLICATIONS

McMillan, G.K.; Considine, D.M. (1999). Process/Industrial Instruments and Controls Handbook (5th Edition). (pp: 4.173-176; 4.186, 4.134-4.136). McGraw-Hill.*

*Primary Examiner* — Daniel S Larkin
*Assistant Examiner* — Jamar Ray
(74) *Attorney, Agent, or Firm* — Bacon & Thomas, PLLC

(57) ABSTRACT

A method which allows especially the extrapolation of the measured value at the upper and lower end of a measuring range where normally no direct measurement range where normally no direct measurement is possible by superposition of interfering signals, for example by reflection on a radar antenna. In the presence of strong interference signals, for example by reflection of a radar antenna. In the presence of strong interference signals, which are for example caused by the natural resonance of the container or neck in which the measuring device is mounted, the direct level indicator signal can be regularly used if it has a high amplitude caused by a superposition with the interfering signal lies between two interfering signals and does not extend beyond these, the level indicator value can be interpolated by the shift of the signals from the point of reflection. The inventive method automatically adapts itself to a prevailing measuring situation while according to known methods for the user has to decide between a measurement via a shift of EOL signal or a measurement via the direct level indicator echo.

18 Claims, 4 Drawing Sheets

(56) References Cited

U.S. PATENT DOCUMENTS

| | | | | |
|---|---|---|---|---|
| 5,438,867 A | * | 8/1995 | van der Pol | 73/290 V |
| 5,587,969 A | | 12/1996 | Kroemer et al. | |
| 5,689,265 A | * | 11/1997 | Otto et al. | 342/124 |
| 5,898,308 A | * | 4/1999 | Champion | 324/643 |
| 6,690,320 B2 | * | 2/2004 | Benway et al. | 342/124 |
| 6,867,729 B2 | * | 3/2005 | Berry et al. | 342/124 |

FOREIGN PATENT DOCUMENTS

| | | | | |
|---|---|---|---|---|
| ID | 19544071 | | 5/1997 | |
| JP | 6-66620 | | 3/1994 | |
| JP | 8-136321 | | 5/1996 | |
| JP | 2000-205932 | | 7/2000 | |
| JP | 2000-241232 | | 9/2000 | |
| WO | WO 00/43806 | | 7/2000 | |
| WO | WO 03019121 A1 | * | 3/2003 | G01F 23/284 |

* cited by examiner

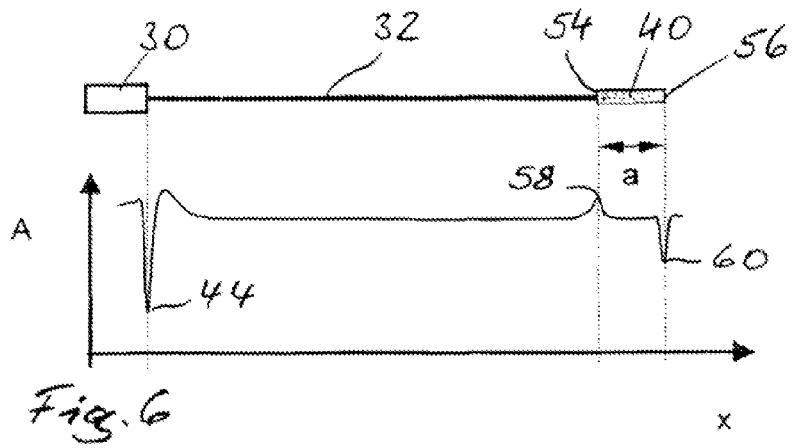
Fig. 6
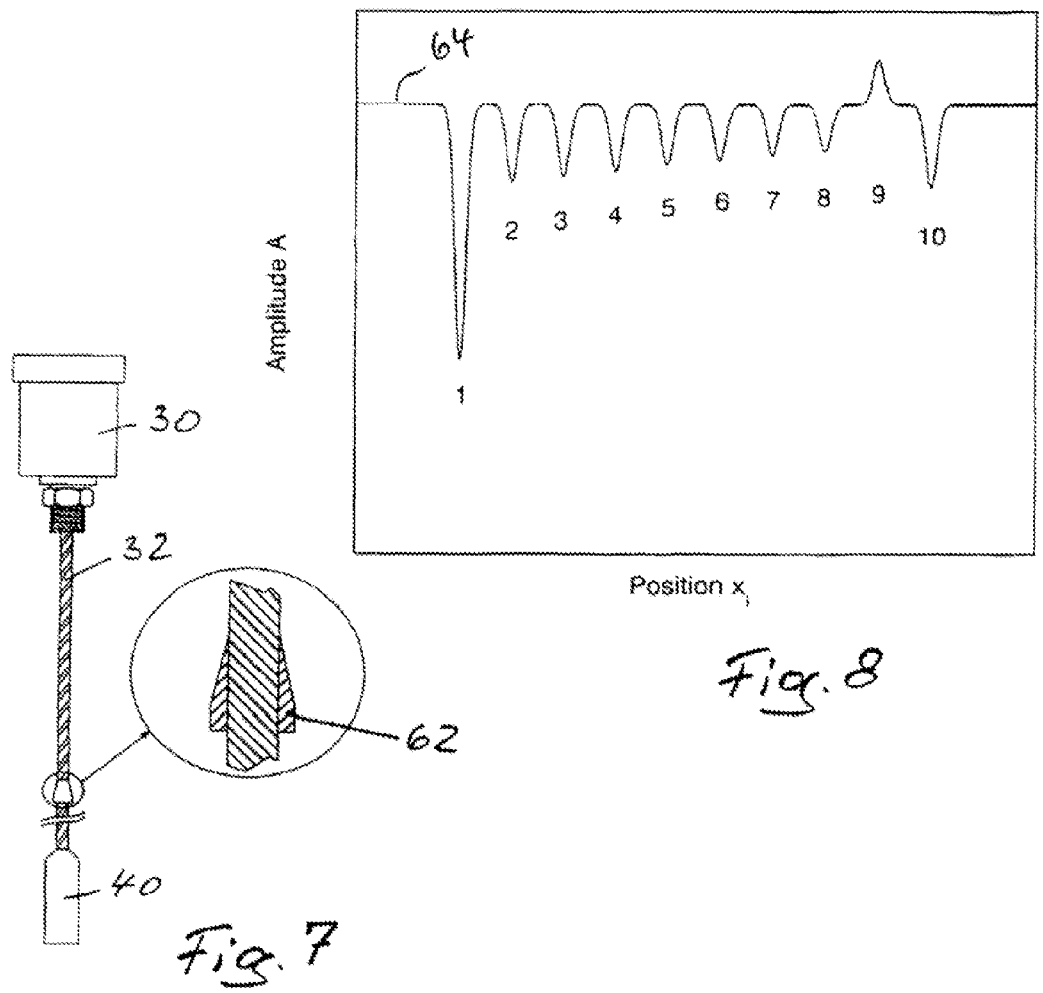
Fig. 7
Fig. 8

METHOD FOR EVALUATING THE MEASUREMENT SIGNALS OF A PROPAGATION-TIME BASED MEASUREMENT DEVICE

TECHNICAL FIELD

The invention relates to a method for determining the fill level of a medium in a container by means of a fill level measurement device which works on the basis of travel, or propagation, time.

BACKGROUND OF THE INVENTION

Fill level measurement devices of this type are known per se; they are usually mounted above the medium, also called "fill material", in, or at, the container. For determining the fill level of the medium, high frequency signals, ultrasonic signals or optical signals generated in the fill level measurement device are sent from the measurement device in the direction onto the medium, where they are reflected at a surface of the medium. These reflected signals, also called the useful signals, are registered by the fill level measurement device. Their travel time is a measure for the distance of the measurement device from the reflecting surface of the medium. Combined with knowledge of the container geometry, the fill level of the medium in the container can be determined.

Known fill level measurement devices of the described kind include, for example, fill level measurement devices which work with microwave- or radar-measurement signals, wherein the radar signals are radiated from an antenna freely onto the medium and can be received as they come back from there. Other fill level measurement devices with radar measurement signals are, for example, those in which the radar measurement signals are guided by a waveguide extending into the fill material.

A major problem for the mentioned fill level measurement devices, which work on the principle of travel time, is that the fill level measurement devices not only receive reflected signals from the fill material surface but also undesired reflections from so-called interference locations in the container. These interference signals, which, for example, are caused by objects installed in the container or by the container geometry, can be superimposed on the actually desired useful signals from the fill material surface in such a way that the useful signals can no longer, or not unequivocally, be identified during an evaluation of the measurement signals.

On the other hand, the interference signals provide a wealth of information, by which the functioning of the measurement device can be reviewed and with which additional information concerning the fill material (information such as dielectric constant, conductivity, moisture content, temperature, mixing ratio, foam formation, phase separation) can be obtained. However, this has not yet happened in this form.

In DE-A-42 33 324, for example, a freely radiating radar device with transmitting and receiving antenna is described. In this case, a signal from the floor of the container is used, in order to determine the fill level of the medium in the container, in the face of a fill level signal which cannot be identified unequivocally. The method described there solely for measurement of liquids assumes, however, a quite accurate knowledge of the dielectric constant and, in some cases, the magnetic permeability of the fill material, in order to determine the unknown fill level. This kind of information is not always present, however, and the physical properties of the medium in the container can also change. In view of this situation, this reference proposes to use the time displacement of the floor signal either to calculate the fill level directly, or else, in the evaluation of the signals of the measurement curve, to place a window over the remaining signals and to identify the fill level signal in this window.

In EP-A-0 457 801, an interference location in the stilling tube is proposed for calibration of a fill level measurement device with guided radar signals, wherein expressly polarizable signals are required and the polarization plane is changeable by a polarization device, whereby the intensity of the interference reflection at the interference location can be changed. Use of a polarization device is not only costly and an extra expense; often the signals cannot even be polarized, for example in the case of single-wire- or coaxial-waveguides of a TDR fill level measurement device.

In WO 00/43806, a TDR fill level measurement device is described, in which the dielectric constant can be determined in the context of an interface measurement. Discussion is of two reflecting surfaces as two "product boundary layers" of the fill material, where one of the interference signals produced thereby can even be generated by the end of the waveguide or by the floor of the container. This reference does discuss a calculation of the dielectric constant of the medium, but the calculation contains error.

Additionally, fill level measurement devices of the past, with guided radar measurement signals, have already included waveguides, whose geometry exhibits given reflection locations, thus known interference locations. However, a comprehensive evaluation of the signals delivered therefrom in the above-mentioned direction has, to this point, not happened.

Thus, for example, U.S. Pat. No. 3,474,337 describes a fill level measurement device with a wave-guide conducting radar signals. This is a so-called "TDR-system (Time Domain Reflectometry)", in which geometric reflection locations in a coaxial waveguide are used as reference locations. The subject matter described and protected in this US patent includes, however, without exception, waveguides having at least two separated guides and otherwise is described in relatively general terms. This patent discloses no possibility of determining, from only the reflections of the interference locations, the fill level or some other characteristic. Interference signals are evaluated only in connection with reflections from the fill material.

SUMMARY OF THE INVENTION

An object of the invention, therefore, is to provide a method, in which the measurement signals and information used for determining the fill level of a medium in a container using a measurement device operating on the principle of travel time can be more comprehensively evaluated than before, and, indeed, without exact knowledge of the physical properties of the medium, and in which method the fill level of the medium can also be determined when, among the measurement signals, a signal originating from a reflection on the surface of the medium cannot, or cannot unequivocally, be determined.

This object is solved according to the invention by a method for evaluating measurement signals of a fill level measurement device operating according to the travel time principle and serving for measuring the fill level of a medium in a container, which method includes the following steps:
a) Obtaining reference signal data as a function of the travel time of the signals;
b) obtaining at least one measurement curve composed of actual measurement signals over a measurement distance, c) comparing the measurement curve, or selected signal data of the measurement curve, with reference signal data and searching for interference and useful signals among the measurement signals, d) weighting information from the discovered interference- or useful signals, as the case may be, for determining the fill level.

In a preferred further development of the method of the invention, the reference signal data are obtained from at least one previously known measurement curve or determined from known measurement device- and/or container-specific data.

Another preferred further development of the method of the invention uses reference signal data which are obtained by evaluating a measurement in an empty container.

A further preferred embodiment of the method of the invention considers extreme values of a measurement curve in the selection of the reference signal data, or signal data of the measurement curve, to be used.

In still another preferred embodiment of the method of the invention, the reference signal data are present in the form of a reference curve.

Further preferred embodiments of the method of the invention provide that the reference curve is compared with the measurement curve by subtraction or by correlation, wherein the subtraction or correlation can be limited also to only a part of the signal data.

Still other preferred embodiments of the method of the invention permit distinguishing the interference- from the useful-signals on the basis of previously known container- or measurement device-specific, characterizing data, wherein also a dividing of the measurement distance into regions can be carried out on the basis of previously known container installations or parts of the measurement device protruding into the container.

In yet other preferred embodiments of the invention, the interference- and useful-signals are distinguished from one another on the basis of given signal information, wherein the amplitude, the sign, the phase relationship, the width and/or the form of the signal data are taken into consideration as signal information.

In still another preferred embodiment of the method of the invention, selected signal data of the measurement curve are matched to corresponding signal data of the reference curve and a time change of the signal data is used to distinguish the useful signals and interference signals.

Other preferred embodiments of the method of the invention take into consideration, that interference signals distinguish themselves from a useful signal in that the interference signals change with time in opposite direction compared to the useful signal, and/or a weighting of the determined interference signals or useful signals, as the case may be, for determining the fill level as a function of the travel time.

Another preferred embodiment of the method of the invention determines the fill level from at least one interference signal of the measurement curve and reference signal data for the case where no useful signal is found in the measurement curve.

A further development of the method of the invention provides that the unknown fill level $L(2)$ at a time $t(2)$ is determined, with reference to the known location $x(0)$ of an installation or part of the measurement device causing an interference signal, from an interference signal at the place $x(1)$ determined for this location $x(0)$ of the container or the measurement device at an earlier time $t(1)$, a fill level $L(1)$ determined at the same time point $t(1)$ from a useful signal, and the changed position $x(2)$ at time $t(2)$ of the interference signal in the actual measurement curve, particularly according to the formula $$L^{(2)} = L^{(1)} \frac{x^{(2)} - x^{(0)}}{x^{(1)} - x^{(0)}}$$

In a further embodiment of the invention, for the case where a fill level signal is not, or is not unequivocally, identifiable, the desired fill level is determined on the basis of the time displacement of at least two interference signals of the measurement curve for known geometric locations.

Another preferred embodiment of the invention is concerned with the case where a fill level has been determined, and wherein the time displacement of at least two interference signals of the measurement curve for known geometric locations, which are in the container above the medium, is used to determine a correction factor for the propagation velocity in the gas phase, which correction factor serves for correcting the determined fill level.

In still another preferred embodiment of the method of the invention, signals, in the region of the measurement curve in which the travel time of actual measurement signals essentially agrees with that of the corresponding reference signal data, are used to obtain information on the condition of the measurement device or on the ability of the measurement device to function.

Other embodiments of the method of the invention allow for different fill level measurement devices using the travel time principle.

One of the basic considerations behind the invention is that, in the case where indeed a signal for a stirrer or other installation in a container is recognizable in the measurement curve, but no fill level signal, this need not mean that the container is empty, as is suggested by previously known fill level measurement devices, but rather that the reflecting surface of the medium in the container must be underneath the stirrer, or the container installation, as the case may be.

Another basic idea of the invention is that, when, in the case of a fill level measurement device based on the use of radar and small dielectric constant of the medium in the container, no fill level signal is recognizable, and a signal from a stirrer or other container installation is not recognizable at the expected location, it can be concluded from these facts that the fill level of the medium must be above the stirrer or installation in the container, since the effective path of the signals of the measurement device from the stirrer or other container installation, and back, brought about by the effect of the dielectric constant becomes longer and the stirrer seems farther away.

Additionally, the invention considers that a tank, a stilling tube perhaps arranged therein, a bypass or even an end weight of a cable-shaped waveguide of a fill level measurement device based on the use of radar bring forth a quantity of signals, from which, and from their position in a travel time curve formed from measurement signals, the fill level can be indirectly inferred. With knowledge of the separation of two interference signals and the actual separation of the reflection locations causing them, one can even estimate the fill level in all fill level measurement devices of the type operating on the travel time principle, without knowing the propagation velocity of the measurement signals. Since the propagation velocity depends on material parameters, for instance the dielectric constant, when dealing with radar signals, it is thus not necessary to know these material parameters.

Another basic consideration of the invention is that, even when the sought useful signal, thus the echo of the measurement signal from the surface of the fill material, cannot be read from a "sink" of signals indistinguishable therefrom, representing a signature, or a background signature, as the case may be, yet the pattern of this "sink", or signature, is changed by the fill level signal in such a way that a comparison of the actual pattern of the signature with an already known pattern permits one to determine the unknown fill level. This problem occurs often in the near region of the fill level measurement device, where the danger is especially great that the unknown fill level echo signal can not be distinguished unequivocally through the decay of the transmitted signal.

The method of the invention proves to enable an increased accuracy and reliability of the measurement, and yields, along with the unknown fill level value, further information on the fill material and the condition of the measurement device.

In summary, this means that the invention permits a determination of the fill level in advantageous manner, when no direct fill level signal can be read from the measurement signals. It additionally permits excluding from consideration those regions of the measurement curve formed from the measurement signals where no fill level signal can exist. The invention enables also the forming of a judgement concerning the condition of the measurement device and/or of the fill material on the basis of signals not dependent on the fill level. It is, consequently, also possible, on the basis of a single, time-displaced, interference signal, to estimate the fill level, knowing the propagation velocity. With help of an evaluation of the time displacement of two interference signals caused by the dielectric constant, the fill level can also be determined without knowledge of the propagation velocity.

BRIEF DESCRIPTION OF THE DRAWINGS

The invention is explained in greater detail below with reference to preferred embodiments and the associated drawing, whose figures show as follows:

FIG. 6 a schematic drawing of a fill level measurement device with waveguide and two reflection locations at its end weight, together with a corresponding travel time curve;

FIG. 7 a schematic drawing of a fill level measurement device with a waveguide and an additional reflection location on the waveguide;

FIG. 8 a schematic drawing of a travel time curve of a fill level measurement device with waveguide and a plurality of reflection locations on the waveguide;

For purposes of simplification and as long as this does not lead to misunderstandings, equal devices, modules or parts of devices or equal fill materials and media are provided with the same reference characters.

DESCRIPTION OF THE PREFERRED EMBODIMENTS

Figure 1:
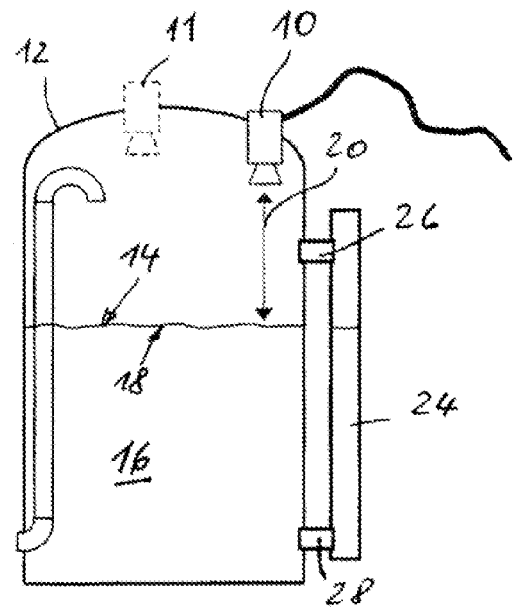
FIG. 1 a schematic drawing of a freely radiating radar measurement device for determining the fill level of a medium in a container.

FIG. 1 shows schematically, and by way of example, a typical arrangement of a fill level measurement device 10 based on the use of radar, mounted on a container 12 and protruding into such. The radar fill level measurement device 10, which serves for determining the fill level 14 of a medium 16 present in the container 12, is electrically serviced over a cable, which is illustrated only schematically, and connected, for example, with a monitor (not shown). The radar fill level measurement device 10 transmits for this purpose, from the schematically indicated horn antenna, radar signals, preferably pulsed measurement signals, in the direction onto the medium 16. These signals are reflected on a surface 18 of the medium 16. This is indicated by the double arrow 20 in FIG. 1. The reflected measurement signals are received by the horn antenna and compared in the radar fill level measurement device 10 with the transmitted measurement signals. The time from the transmitting of a measurement signal to the receiving of the reflected signal is registered and is a measure for the separation between the radar fill level measurement device 10 and the surface 18 of the medium 16. Taking the geometry of the container 12 into consideration, this separation is converted to the sought fill level of the medium 16. For the case where no signal is unequivocally recognizable in the received signals as the fill level signal, thus the signal reflected from the surface 18 of the medium 16, the fill level of the medium 16 is determined according to the method of the invention.

FIG. 1 also shows schematically a filling tube 22 and a by-pass tube 24 with a transverse, upper lateral tube 26 and a transverse, lower lateral tube 28. The transverse, upper lateral tube 26 leads likewise to a reflection of the measurement signals transmitted from the radar fill level measurement device 10, and this interference signal can be utilized according to the method of the invention for determining the unknown fill level.

Designated as "interference signals" here are those signals which are not signals which come from a reflecting surface of the medium. They do not "interfere" in the method of the invention in the literal sense of the word, but rather serve, in fact, for establishing, or determining, the unknown fill level. The name "interference signals" comes from the prior art, where these signals interfere in so far as they can cover the actual fill level signals or prevent their unequivocal identification. Known methods for determining the unknown fill level are relatively helpless in the absence of an unequivocal fill level signal and, therefore, do not permit a unique determination of the fill level.

If the radar fill level measurement device 10 is mounted at a position 11 in the container 12 indicated by the dashed-line representation, this will lead to an interference signal from the upper portion of the filling tube 22. Also this signal can be utilized in the method of the invention for determining the unknown fill level.

For the sake of completeness, it should be noted that the fill level measurement device shown in FIG. 1 can also be another freely radiating measurement device. Thus, it is, for example, conceivable that a fill level radar device with a planar antenna or a fill level radar device with a rod antenna could be utilized, as could an ultrasonic fill level measurement device. The described interference signals occur also in the case of these fill level measurement devices operating on the travel time principle, and these interference signals can be used in connection with the method of the invention for determining the unknown fill level in the case where a fill level signal cannot be identified unequivocally or cannot be identified at all.

Figure 2:
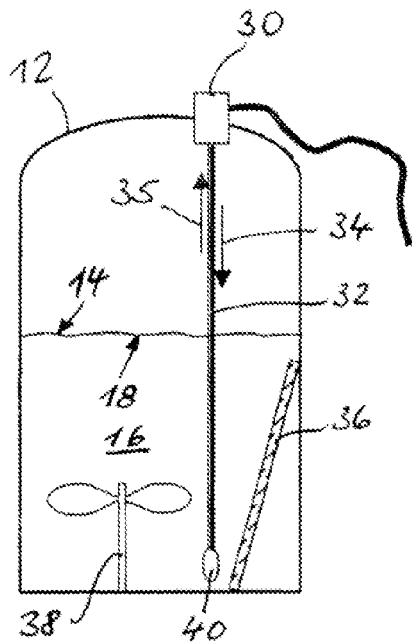
FIG. 2 a schematic drawing of a fill level measurement device on a container, using radar signals guided on a waveguide.

Another construction of a fill level measurement device, for which the method for determining a unknown fill level can be carried out, is shown in FIG. 2. This is a so-called TDR fill level measurement device 30, in which microwave- or radar-signals guided on a waveguide 32 are used. The measurement signals are guided on the waveguide 32, which extends into the medium 16, reflected at the surface 18 of the medium 16, and led back on the waveguide 32 to the TDR fill level measurement device 30. This signal movement is illustrated in FIG. 2 by the two arrows 34, 35.

Also in the TDR fill level measurement device 30, as already described for FIG. 1, the travel time of the measurement signals to and from the reflecting surface 18 of the medium, back to the TDR fill level measurement device 30, (thus, the separation between the TDR fill level measurement device 30 and the medium 16) is registered, and the unknown fill level determined therefrom. It is assumed, however, that among the received measurement signals an unequivocal signal for the fill level can be found. If this is not the case, the method of the invention can be used to determine the fill level on the basis of interference signals and/or from the special evaluation of the time displacement of individual signals or signal patterns, as the case may be. Interference signals in TDR fill level measurement devices can occur anywhere where container installations can be found near the waveguide 32. These are, in the illustrated example of FIG. 2, a ladder 36 and a stirrer 38.

In order, in the case of an equivocal signal for indicating a reflecting surface 18 of a medium 16 in a container 12, to nevertheless be able to determine the fill level of the medium, the method of the invention is applied for a fill level measurement device according to one of the examples of FIGS. 1 and 2 as follows.

First, reference signal data are obtained as a function of the travel time of the signal, which, for example, can be reference signal data from at least one previously known measurement curve already obtained at an earlier point in time or determined from known measurement device- and/or container-specific data. In the latter case, one is concerned, for example, with the above-described signals originating from ladders 36, filling tubes 22, transverse tubes 26, 28 of by-pass tubes, or stirrers 38. Also the weight 40, which is attached to the end of the waveguide 32 to keep the waveguide stretched straight in the container, produces a noticeable signal, which is generally referred to as the EOL-signal (End-Of-Line signal). Instead of the end weight 40 illustrated here, other embodiments of the waveguide 32 or other applications and containers can use a connecting in which the waveguide 32 is tensioned to the floor of the container. Also a connecting such as this produces an EOL-signal.

The simplest way of proceeding is to obtain the signals of interference locations and reflection locations by performing a so-called empty measurement with the fill level measurement device in an empty container 12. The various signals, which are to serve as reference signals, are analyzed and characterized, preferably with reference to their amplitude and signal form, and the associated distance information is matched to them as distance to the measurement device and/or, considering the propagation velocity of the signals in the container, as travel time information. If the signals of the empty measurement are merged into a travel time curve, one speaks also of a "signature" of the container (and the installations installed therein).

Subsequently, a measurement curve composed of actual measurement signals or selected signal data of the measurement curve along the measurement distance between fill level measurement device and surface of the medium are compared with the reference signal data, and interference and useful signals within the measurement signals are sought out and marked. The interference and useful signals, respectively, are evaluated and weighted with reference to which form they can serve for further determination of the fill level, or for further information on the medium and on the functionality of the fill level measurement device, as the case may be. The reference signal data or signal data of the measurement curve to be used for the method of the invention can, for example, be selected as the extreme values of the measurement curve.

As already explained above, the reference signals can be arranged in the form of a reference curve and compared with the actual measurement curve, or, when only selected reference signals are used, these are compared with actual measurement signals corresponding in the measurement distance or with reference to the travel time. Such a comparison, wherein the goal is to find and evaluate changes of the signals in form and time relationship (travel time), thus time displacement, is preferably done by a correlation of the relevant signal data or by a subtraction or by a comparison of the position of the extreme values of the measurement curve with extreme values of the reference curve.

In the distinguishing of the interference from the useful signals, especially those signals play a role when they can be identified on the basis of previously known container-, respectively, measurement device-specific, characterizing data, such as, e.g., pre-known container installations or parts of the measurement device protruding into the container. With the help of these signals, also a dividing of the measurement distance, or the signals representing the measurement distance, into special regions can be done, which regions are searched for interference or useful signals, as the case may be. The advantage is that, in such an evaluation, only the actually interesting regions are searched. No time and resources are expended for evaluating signals not of interest, or uninteresting signals.

Preferably amplitude, sign, phase relationships, width and/or the form of the signal data are utilized as signal information for evaluating the signals, wherein especially those regions are given special attention where the interference signals change with time oppositely to the useful signal. This is thus of interest, because, for example, in measuring fill level with radar and an increasing fill level, all interference signals lying underneath the fill level signal move downwards, thus in the opposite direction compared with the fill level echo, due to the reduced propagation velocity in the medium.

Figure 3A:
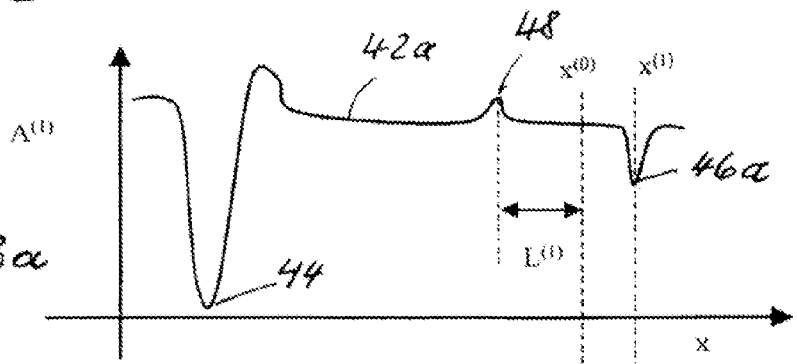
FIGS. 3a,b schematic drawings of two measurement curves of a fill level measurement device in the case of a known interference location at different points in time.
Figure 3B:
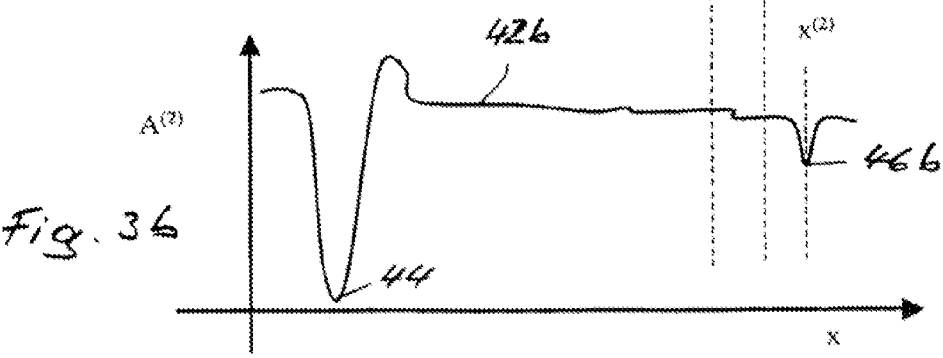

A practical example of determining fill level by the method of the invention, when an interference signal of a known reflection location can be unequivocally identified, is described as follows. For this purpose, reference is made to the example of a TDR fill level measurement device with a waveguide 32, as illustrated in FIG. 2. FIGS. 3a and 3b show, by way of example, curves 42a, 42b of measurement signals, in which FIG. 3a is a plot of measurement signal amplitude at a time $t^{(1)}$ as a function of the distance x to the TDR-device 30. A clearly recognizable signal 44 at the beginning of the travel time curve 42a in FIG. 3a is the signal coming from the coupling of the measurement signal produced in the TDR fill level measurement device 30 onto the waveguide 32. This signal is a strong reference signal and is referred to as the "fiducial signal". Another signal 46a at the end of the travel time curve 42a is the EOL-signal from the end of the waveguide 32. At the time $t^{(1)}$ illustrated in FIG. 3a, a fill level signal 48 can be unequivocally identified, this originating from a reflection at the surface of the medium. This signal, referenced here for purposes of simplicity as fill level signal 48, lies between the fiducial signal 44 and the EOL-signal 46a.

If, at a later point $t^{(2)}$ in time, no fill level signal is unequivocally perceivable in a measurement curve 42b, as is the case in FIG. 3b, then the unknown fill level $L^{(2)}$ of the medium in the container at time $t^{(2)}$ can be determined using the known reflection signal from the end of the waveguide, the EOL-signal 46b (see FIG. 3b). In a comparison of the measurement curves 42a and 42b, it becomes apparent that the EOL-signal 46a of the earlier measurement appears shifted in time relative to the EOL signal 46b, although, in fact, the length of the waveguide in the container has not changed. On the basis of this, the fill level can be determined as follows:

First, from the directly recognizable fill level signal 48 of the measurement curve 42a and the apparent shift $x^{(1)}-x^{(0)}$ of the EOL-signal 46a, a constant B is determined, with $B=(x^{(1)}-x^{(0)})/L^{(1)}$, wherein $L^{(1)}$ is the fill level determined from the fill level signal 48 in the measurement curve 42a, referenced to the actual location $x^{(0)}$ of the end of the sonde. At time $t^{(2)}$, when no fill level signal can be directly determined, the fill level $L^{(2)}$ can be calculated from the previously determined value of B and the apparent shift of the sonde end signal $x^{(2)}-x^{(0)}$ using the formula $L^{(2)}=(x^{(2)}-x^{(0)})/B$.

Figure 4:
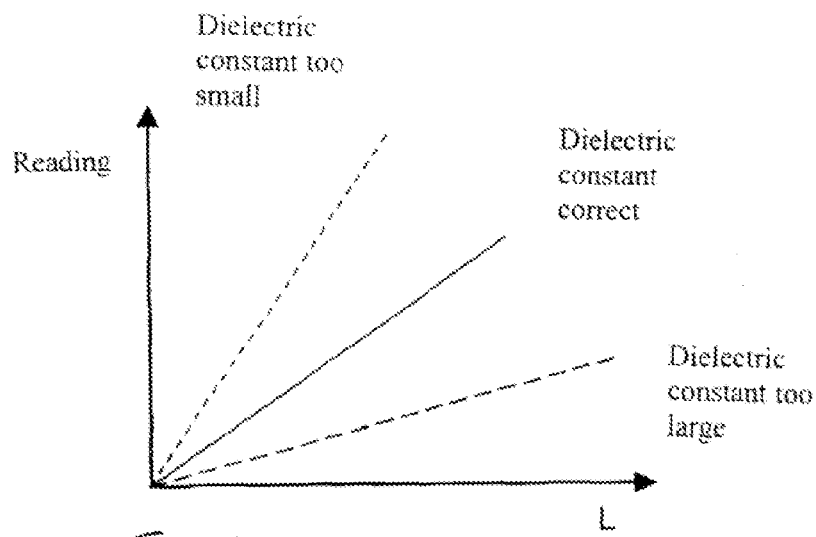
FIG. 4 a graph schematically illustrating the influence of a selection of dielectric constants on the indicated fill level reading in comparison to the actual fill level.

In the case of damping-free, non-magnetic dielectric as the medium in the container, $B=\sqrt{\in}-1$, where $\in$ is the dielectric constant of the medium. Known methods for calculating the fill level from an interference signal use knowledge of the dielectric constants, while, in the method described here, this value does not need to be known. The measurement device instead calibrates itself and, even in the case of changing media, the user does not have to get involved with a new calibration. Additionally, a significantly higher accuracy is achieved compared with the known methods. If a fixed, preselected value of the dielectric constant were used for the calculation, and such would not agree with the actual value, for instance, because of a changed moisture content of a granular material, then one would, as illustrated in FIG. 4, obtain an incorrect relationship between the displayed fill level and the actual fill level. Since the dielectric constants of the medium cause a time shifting of the signals that come in time after the fill level signal in the measurement curve, the graph of FIG. 4 permits the error present in the fill level registration to be estimated, when the determination of the fill level proceeds using dielectric constants of the medium which are too large, or too small, as the case may be.

Figure 5:
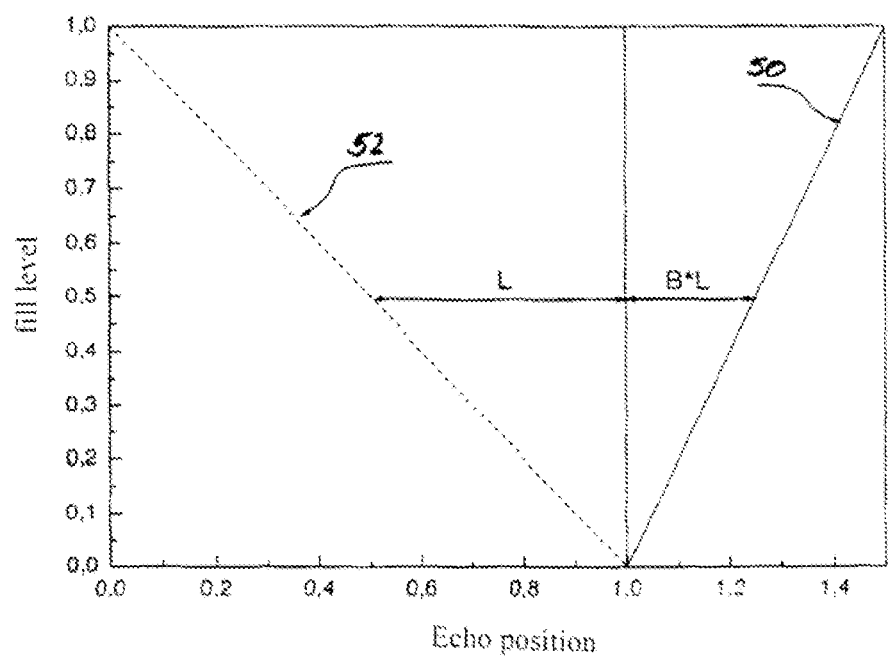
FIG. 5 a graph for determining the fill level according to the invention.

The additional graph of FIG. 5 illustrates determination of the fill level L in yet another way. This graph is for an example of a fill level measurement device using the travel time principle, in this case preferably a radar device. Relative fill level is plotted versus position of the received signals in the measurement curve, or versus travel time, as the case may be. Determination of the unknown fill level L proceeds using the above-presented formula, with the limiting lines being formed, on the one hand, by the EOL-signal 50 and, on the other hand, by the fill level signal 52. The graph is self-explanatory.

If neither the actual fill level value is directly measurable, nor the apparent position of the reflection location determinable, thus the EOL-signal 46a,b or another signal of a reflection location in the measurement distance and coming from an installation below the fill level, then the last valid value of L can be output. Another possibility is to use the last determined rate of change of L to change the value of L or to output a warning or trouble report. All these reactions can occur selectably also following an adjustable delay time.

The described process is applicable to any, but known, interference reflections. In contrast to previously known processes, the actual dielectric constant of the medium in the container does not need to be known in the method of the invention. Instead, the fill level measurement device is self-calibrating, when at least one signal of a known reflection location, which is not the surface of the medium, is present, thus, a known, important interference signal, simultaneously with the direct fill level signal from the surface of the medium.

The method of the invention permits, especially, also an extrapolation of the measurement values at the upper and lower ends of the measurement distance, where, as a rule, no direct measurement is possible due to the superposition of interference signals, for instance from reflections on a radar antenna. In the case of strong interference signals, perhaps from natural resonances of the container or a nozzle, in which the measurement device is installed, the direct fill level signal can always be used, when it is large in amplitude and, consequently, detectable because of superposition of an interference signal, while then, when it lies between two interference signals and does not protrude above these, a fill level value can be interpolated using the shifting of the signal of the reflection location. The method adapts itself also independently for a given measurement situation, while in previously known methods the operator must decide between measurement on the basis of shifting of the EOL signal or measurement using the direct fill level echo.

For the case where at least two signals and signal data of reflection locations, preferably in the lower region of the waveguide, are known, the method of the invention can be illustrated as follows. For simplification, the method is explained on the basis of two reflection locations at the beginning and end of the end weight 40 (see, in this connection, FIG. 2) of a waveguide and with reference to FIG. 6. FIG. 6, in principle, returns to the example of the radar fill level measurement device 30 with waveguide 32 as shown in FIG. 2. Here, end locations 54, 56 of the end weight 40 (see FIG. 2) of the waveguide 32 are indicated as having a previously known physical separation a from one another. Below in FIG. 6, the measurement signals stemming from a measurement in an empty container are assembled into a measurement curve. Again a fiducial signal 44 (see FIGS. 3a, b) can be recognized, along with the reflection signals 58, 60 of the end locations 54, 56 of the end weight 40. Since this was an empty measurement, there is no fill level signal. For simplification, also the illustration of other interference signals from installations in the container was omitted.

Now, consider a situation, where a measurement curve of the type shown in FIG. 6 for an empty container is compared with an actual measurement curve, which shows no direct signal which can be interpreted as a fill level signal. The reflection signals 58, 60 of the end locations of the end weight 40 are displaced with respect to time from one measurement curve to the other. Let $\Delta x_1$ be the shift of the upper reflection signal 58 out of its position for empty container, with it being assumed that the fill level lies above the end location 54, and let $\Delta x_2$ be the shift of the lower reflection signal 60 out of its position for empty container at the same point in time, while a is the physical separation of the two reflection locations 54, 56. The fill level can then clearly be calculated from the formula $L=\Delta x_2 a/(\Delta x_2-\Delta x_1)$.

Since at start of medium on the waveguide 32 it appears that a more or less full container is present in the case of apparently small dielectric constant (see also FIG. 4), it makes sense to first indicate a fill level different from zero, when the expression $\Delta x_2 - \Delta x_1$ in the denominator of the above formula exceeds a minimum. Only then can it be guaranteed that there is actually fill material in the container. If the fill level is under the reflection location 54, a situation which can be recognized by a negligible displacement $\Delta x_1$, then the last determined value for $a/(\Delta x_2 - \Delta x_1)$ can be used for calculating the fill level. The method is suited for fill materials of small dielectric constant and small damping, for example, perhaps, foamed plastics.

If more than two known reflection locations are present, then an even more accurate determination of the fill level can be achieved. Then it makes sense always to use the uppermost reflection location covered by fill material, and the lowest, in the above formula, and the displacement of intermediately lying reflection locations can be used to check for plausibility.

The last-described method of the invention, where a plurality of reflection locations are used, can be realized in simple manner with a waveguide with a plurality of reflection locations purposely placed thereon. Suited for this are all known types of waveguides, e.g. Sommerfeld waveguides (one-wire waveguides), Goubau waveguides (one-wire waveguides with dielectric coating), Lecher line (two-wire waveguides), coaxial lines, microstrip guides or hollow guides with any, e.g. rectangular or round, cross section.

Suited for reflection locations are local changes of geometry, e.g. changes of the cross section of metallic or dielectric structures (thickenings, narrowings or other irregularities), changes of the dielectric properties at locations where the electric field is different from zero, changes of the magnetic properties at locations where the magnetic field is different from zero, or changes of conductivity at locations where the current density is different from zero.

Advantageously, a whole series of such reflection locations are placed along the waveguide, with the condition that only a small part of the total energy should be reflected at each individual reflection location. The reflection locations can, but do not have to, be equidistant. They can be similar, but they can also be different.

FIG. 7 shows, by way of example, such a reflection location placed on a waveguide 32, it being understood that also a plurality of such locations could be placed on the waveguide 32. The reflection location, embodied as sleeve 62, is secured in suitable manner on the waveguide (here preferably a Sommerfeld waveguide 32 in the form of a wire cable) sufficiently that it can withstand mechanical loading from the fill material.

Changes of the reflections, thus of the signals received by the measurement device, at these reflection locations, i.e. changes in amplitude and travel time, are registered according to the method of the invention and evaluated, along with, if present, the reflections at the fill material surface, or phase boundaries, as the case may be.

An example of a travel time signal curve 64 of a waveguide with a plurality of purposely placed reflection locations is presented in FIG. 8. This example concerns again a Sommerfeld waveguide 32 in the form of a wire cable, on which are secured, screwed, clamped and/or soldered seven, equidistant and similar, metallic thickenings, preferably in the form of the sleeve 62 shown in FIG. 7. The reflection signals produced thereby from the separate reflection locations upon excitation with pulse signals are labeled in the travel time curve 64 with the numbers 2-8. The thickenings can be so formed that a negative transmitted signal results in a primarily negative reflection, which can then be distinguished from an, as a rule, positive fill level signal at the transition from air to fill material. Alternatively, the reflection locations can be so formed that a special signal form arises, which can be amplified, for example, by cross-correlation compared to other signals. Considering travel time curve 64, the reflection No. 1 is recognized as that from the transition to the Sommerfeld waveguide 32, corresponding to the known fiducial signal of FIGS. 3*a,b*. Reflections No. 2 to No. 8 stem from the seven thickenings 69 (see also FIG. 7), while reflection No. 9 is from the beginning 54 of the end weight 40 and reflection No. 10 from end 56 of the end weight 40 (see, in this connection, also FIG. 6).

Figure 9:
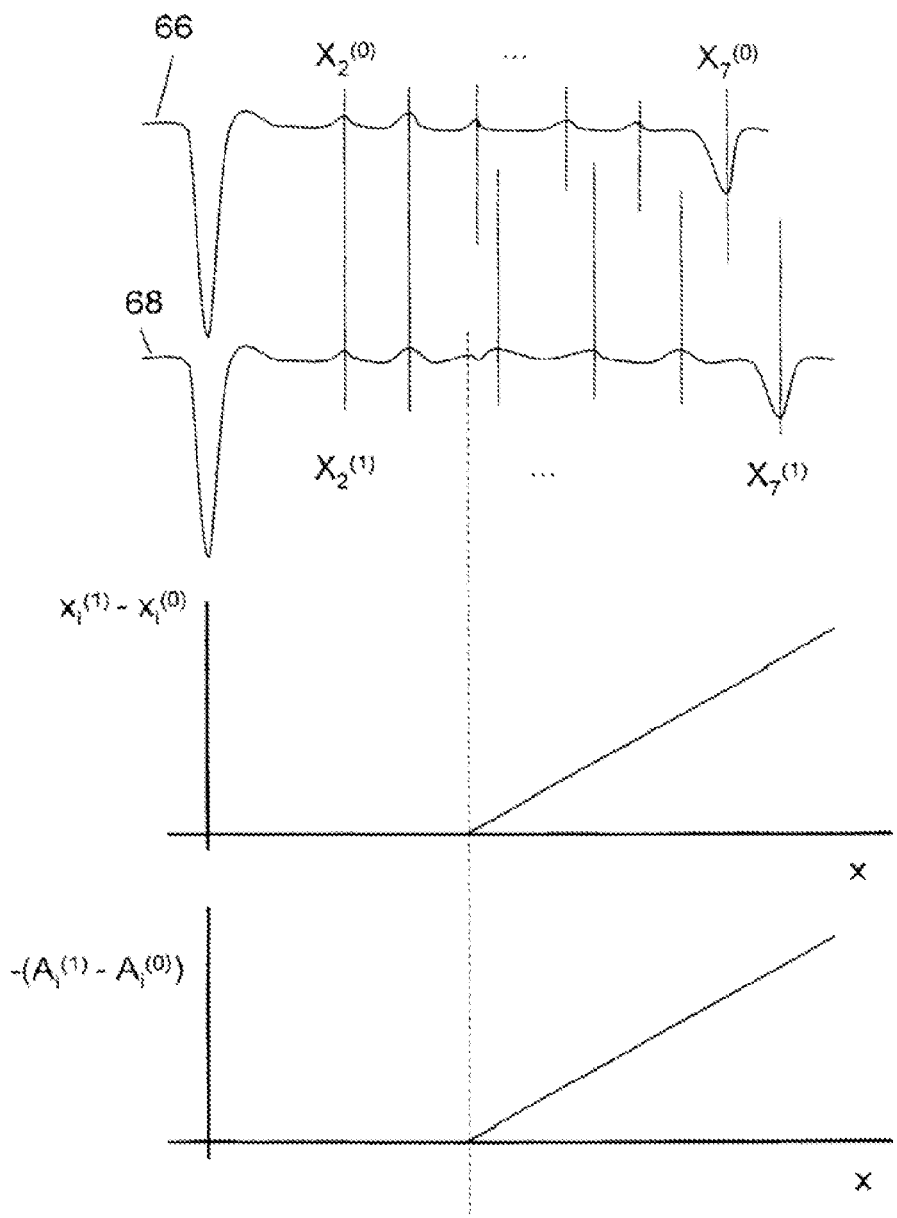
FIG. 9 a schematic drawing of a travel time curve corresponding to FIG. 8 for two different fill levels, as well as graphs for determining complex dielectric constants according to the invention.

With plural reflection locations, determination of the fill level can be accompanied by a sectional determination of the locationally dependent, complex dielectric constant $\in = \in_1 + i\in_2$. This is illustrated in FIG. 9. The procedure is to compare the locations $x_i^{(0)}$ and amplitudes $A_i^{(0)}$ of interference signals of the travel time curve 66 for empty container with the locations $x_i^{(1)}$ and amplitudes $A_i^{(1)}$ of these interference signals in the actual travel time signal curve 68. In the locations where these values do not change, there is clearly no fill material. From the change of locations, the travel time (given by the index of refraction n) can be sectionally determined, which, in turn, yields the real part $\in_1$ of the dielectric constant. From the change of the amplitudes, the damping constant $\alpha$ can be determined, and from that, in turn, the imaginary part of the dielectric constant $\in_2$. The formal relationships of this calculation are well known to those skilled in the art and described, for example, in the work of M. Dressel and G. Grüner, Electrodynamics of Solids, Cambridge University Press, Cambridge (2002).

The dielectric function contains information on propagation velocity and damping. For example, a correction factor for the fill level measurement can be derived from the propagation velocity above the medium. With this, for example, the influence of different gases above the fill material on the velocity of light can be compensated in high accuracy radar tank-level-measurements using the 'signature' of a stilling tube (superposition of incidental reflections at many small geometric interferences, such as weld seams or holes), in order to obtain a more accurate measurement value. No expensive equipment for changing the polarization is required, such as was previously necessary. Furthermore, one can use the propagation velocity and/or damping of the medium to draw conclusions regarding the properties of the medium, properties such as its conductivity, moisture content, temperature, degree of mixing, de-mixing, layering, foam formation, etc. If the signal damping determined above the surface of the fill material is large, one can conclude that a reduced measurement reliability is present due to signal damping.

As shown, the different embodiments of the method of the invention enable:
  use of signals not caused by the fill level to determine a region of the measurement curve, and thus of the measurement distance, where the fill level cannot be;
  use of signals not caused by the fill level to determine the condition or the measurement capability of the device; and
  use of signals not caused by the fill level to determine properties of the fill material, such as, for example, complex dielectric constant, conductivity, moisture content, temperature, state of mixing, foam formation, etc. For such purposes, the invention makes use of interference signals, which are not caused by the fill level and originate, for example, instead from the container or tank itself, a bypass-tube, a stilling tube, the waveguide, from another waveguide as part of the measurement system or the tank, or from markings, which are added onto the aforementioned objects. These reflection signals, which are not caused by the fill level, can, however, also stem from the coupling of the fill level measure device.

The invention takes into consideration, also, that the signals mentioned here can also be superpositions of several or many signals.

Also especially important is that, when an evaluation of the measurement signals by the method of the invention leads to the result that, in comparing an actual measurement with a measurement performed at an earlier point in time, no unchanged region of the measurement curve is found, this points to an over-filling of the container.

The invention claimed is:

1. A method for evaluating measurement signals of a measurement curve of a fill level measurement device operating on a travel time principle and serving for measuring the fill level of a medium in a container, which method comprises the steps of:
   using the fill level measurement device operating on a travel time principle to perform the steps of:
   obtaining reference signals data as a function of the travel time of the signals, whereby the reference signals data are obtained by at least one known measurement curve or determined from known measurement-specific or container-specific data;
   obtaining at least one current measurement curve composed of current measurement signals along a measurement distance;
   comparing the current measurement curve, or selected data of the current measurement curve, with corresponding reference signal data and identifying interference signals and a useful signal, if available, among the current measurement signals;
   weighting information from said identified interference signals and/or said useful signal, if available;
   selecting a measurement curve obtained at an earlier point in time showing said interference signals and a useful signal;
   determining the displacement of said interference signals between said selected measurement curve and the current measurement curve;
   for the case that no useful signal can be found in the current measurement curve, determining said interference signals, which correspond to a known location of the container or the measurement device located in the medium; and
   determining a current unknown fill level by the aid of the displacement of said interference signals between a first point in time and a current point in time and said useful signal obtained at the earlier point in time,
   determining current unknown fill level L(2) at a time t(2), with reference to the known location x(0) of an Installation or part of the measurement device causing said interference signals, from interference signals determined for this location x(0) of the container or the measurement device to be at a place x(1), at a time t(1) that is earlier than the time t(2), a fill level L(1) determined at the same time t(1) from a useful signal, and a position x(2) at time t(2) of said interference signals in an current measurement curve, according to the formula $$L^{(2)} = L^{(1)} \frac{x^{(2)} - x^{(0)}}{x^{(1)} - x^{(0)}}.$$

2. The method as claimed in claim 1, wherein:
said interference- and useful-signals are distinguished on the basis of previously known container- or measurement device-specific, characterizing data.

3. The method as claimed in claim 1, wherein:
said measurement distance is divided into regions on the basis of previously known container installations or parts of the measurement device protruding into the container, and these regions are searched for at least one of interference or useful-signals.

4. The method as claimed in claim 1, wherein:
said interference and useful-signals are distinguished from one another on the basis of given signal information.

5. The method as claimed in claim 4, wherein:
the signal data has amplitude, sign, phase relationship, width and form; and at least one of the amplitude, the sign, the phase relationship, the width or the form of the signal data are taken into consideration as signal information.

6. The method as claimed in claim 1, further comprising the step of:
matching selected signal data of the measurement curve to corresponding signal data of the reference curve and a time change of the signal data is used to distinguish the useful signals and interference signals.

7. The method as claimed in 6, wherein:
said interference signals are distinguished from a useful signal in that the interference signals change with time in opposite direction compared to the useful signal.

8. The method as claimed in claim 1, wherein:
said interference or useful signals are weighted for determining the fill level as a function of the travel time.

9. The method as claimed in claim 1, wherein:
for the case where a fill level signal is not, or is not unequivocally, identifiable, the fill level is determined on the basis of a time displacement of at least two interference signals of the measurement curve for known geometric locations.

10. The method as claimed in claim 1, wherein:
for the case where a fill level has been determined, a time displacement of at least two interference signals of the measurement curve for known geometric locations, which are in the container above the medium, is used to determine a correction factor for a propagation velocity in a gas phase, and this correction factor serves for correcting the determined fill level.

11. The method as claimed in claim 1, wherein:
signals, in the region of the measurement curve in which the travel time of actual measurement signals essentially agrees with that of the corresponding reference signal data, are used to obtain information on the condition or the ability of the measurement device to function.

12. The method as claimed in claim 1, wherein:
the measurement device is an ultrasonic fill level measurement device.

13. The method as claimed in claim 1, wherein:
the measurement device is an optical fill level measurement device.

14. The method as claimed in claim 1, wherein:
the measurement device is a fill level measurement device that uses radar signals.

15. The method as claimed in claim 14, wherein:
the fill level measurement device is a freely radiating radar measurement device.

16. The method as claimed in claim 14, wherein:
the fill level measurement device uses radar signals, which are guided on a waveguide.

17. The method as claimed in claim 14, wherein:
a complex dielectric constant is determined in addition to the fill level.

18. The method as claimed in claim 17, wherein:
a complex dielectric constant is determined sectionally.

* * * * *